United States Patent [19]

Rugraff

[11] Patent Number: 5,044,227
[45] Date of Patent: Sep. 3, 1991

[54] VEHICLE TRANSMISSIONS EQUIPPED WITH ELECTRIC RETARDERS

[75] Inventor: Guy Rugraff, Pantin, France

[73] Assignee: Labavia-S.G.E., Montigny Le Bretonneux, France

[21] Appl. No.: 543,471

[22] Filed: Jun. 26, 1990

[30] Foreign Application Priority Data

Jun. 30, 1989 [FR] France ................. 89 08794

[51] Int. Cl.⁵ .................. F16H 57/02; H02K 49/00; F16D 3/16
[52] U.S. Cl. .................. 74/606 R; 310/103; 310/105; 464/136
[58] Field of Search ............... 310/103, 105; 464/136; 74/606 R

[56] References Cited

U.S. PATENT DOCUMENTS

| | | | |
|---|---|---|---|
| 4,398,111 | 8/1983 | Zuch | 310/105 |
| 4,529,392 | 7/1985 | Lindenthal et al. | 464/136 X |
| 4,591,349 | 5/1986 | Lenhard-Backhaus et al. | 464/136 |
| 4,683,392 | 7/1987 | MacDonald et al. | 310/105 |
| 4,791,330 | 12/1988 | Charbonnier et al. | 310/105 |
| 4,853,573 | 8/1989 | Wolcott et al. | 310/105 |
| 4,876,471 | 10/1989 | Lacour | 310/105 |
| 4,880,405 | 11/1989 | Ende | 464/136 X |
| 4,946,422 | 8/1930 | Lindenthal et al. | 464/136 X |

FOREIGN PATENT DOCUMENTS 0148170 11/1981 Japan ................. 310/105

Primary Examiner—Vinh T. Luong
Attorney, Agent, or Firm—Larson & Taylor

[57] ABSTRACT

To reduce as much as possible the extension of a vehicle transmission due to the cantilevered mounting of an electric retarder (2, 3) with two rotor discs (9) on the casing of the gearbox of this transmission, between the gearbox flange (14) and the journal cross (33) of the cardan joint (15), a tubular insert (23) and a reversed cardan flange (24) are provided successively. These two parts are applied one against the other along external collars which form an annulus (13) on which the rings (10) of the two rotor crowns of the retarder are mounted axially on each side.

6 Claims, 3 Drawing Sheets

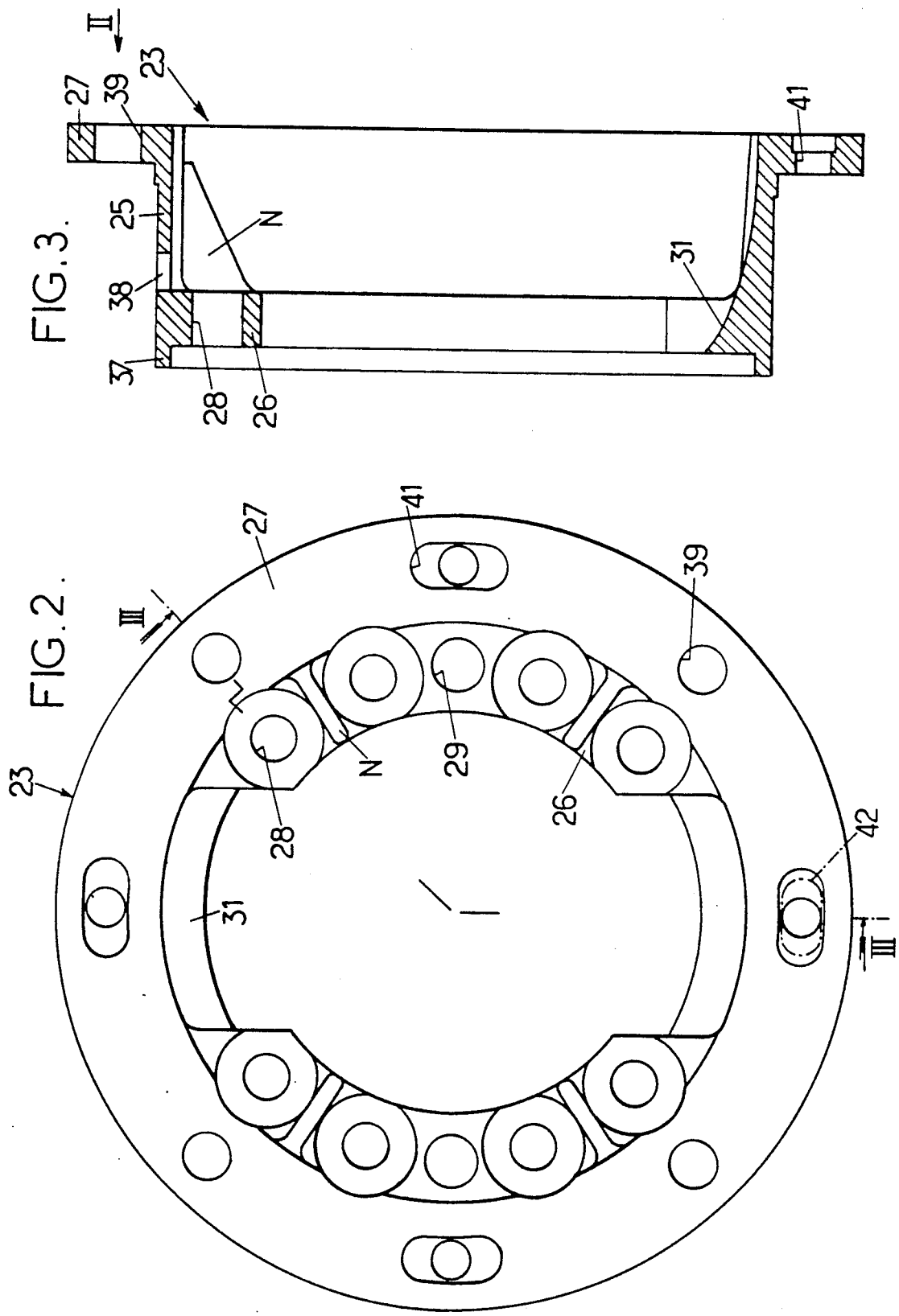

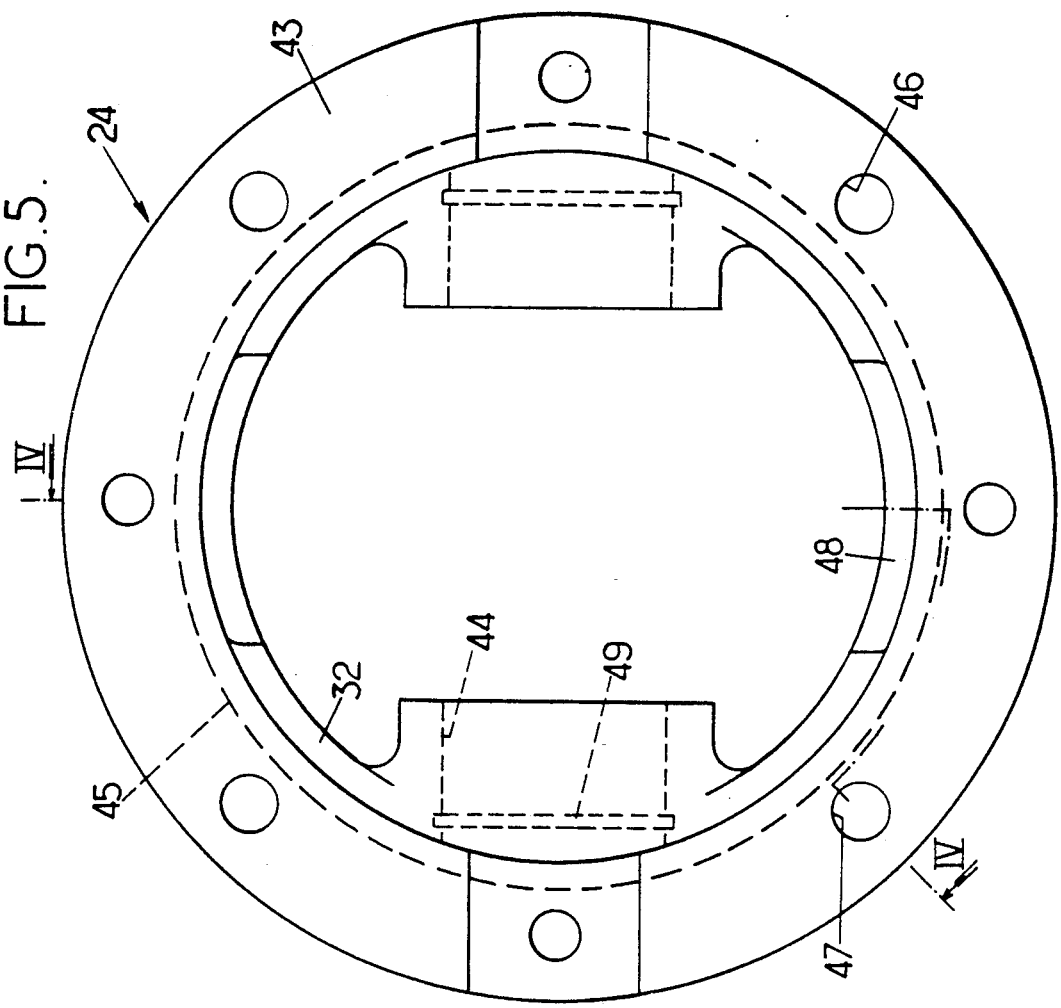
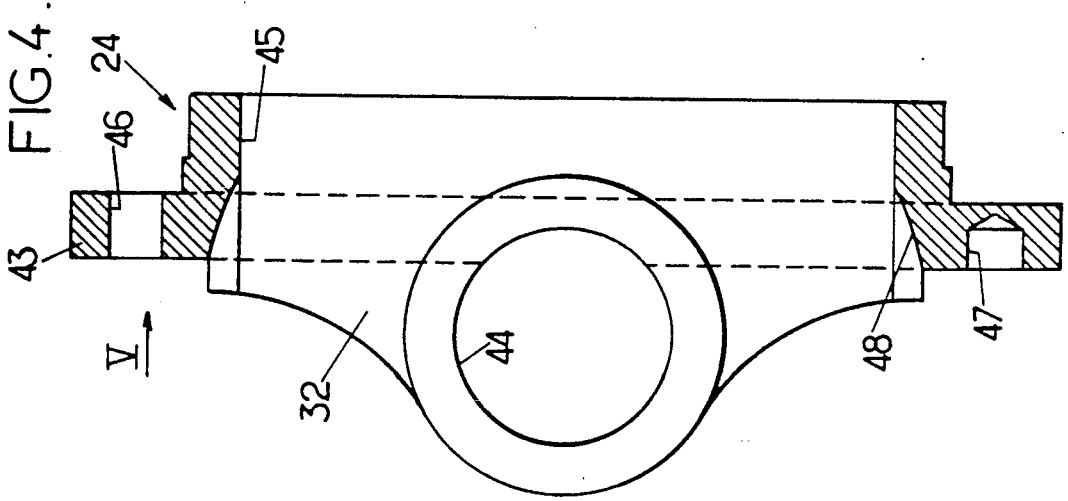

VEHICLE TRANSMISSIONS EQUIPPED WITH ELECTRIC RETARDERS

BACKGROUND OF THE INVENTION

1. Field of the Invention

The invention relates to vehicle transmissions, i.e. the series of members transmitting the rotational movement of the engine to the wheels of the vehicle, which members comprise a gear-box, a rear axle and a double cardan shaft for transferring the torque from the gearbox to the rear axle while allowing relative transverse movements thereof.

It relates more particularly, among these transmissions, to those equipped with an electric eddy current retarder exerting a braking torque thereon at desired times, said retarder comprising on the one hand an annular inductor stator cantilevered on the casing of the gearbox of the vehicle by means of an appropriate frame and on the other hand a rotor comprising two induced ferromagnetic material discs which surround the stator and are both supported by a part itself cantilevered on a stub shaft inside the casing, each disc being fixed for this purpose, by means of a crown of arms forming ventilation fins, to a ring which is in its turn fixed to said part.

2. Description of the Prior Art

In known embodiments of the transmissions of the kind in question, the part on which the two rings are mounted is generally a special insert plate which is fixed both to a "gear-box flange" fixed on a stub shaft inside the casing of the gearbox and, on the axial side opposite said stub shaft, to an end flange of the contiguous cardan joint.

It should in fact be noted that it is not possible in practice to fit the rotor crowns directly on the gearbox flange, for at least the crown disposed on the gear-box side would then have to be mounted before the flange is positioned on the gear-box.

Now, such positioning is provided by forced axial fitting together of complementary splines formed respectively on the stub shaft inside the gear-box and on a cylindrical sleeve extending the flange such force fitting only being able to be carried out with the flange not loaded.

The special insert plate must have a certain thickness since it must be able to transmit the whole of the drive torque of the vehicle from the cardan to the gear-box flange.

Thus, it has the double drawback of relatively high weight and axial dimension.

The last drawback may be serious in the case of very short transmissions, i.e. in which a limited space is available between the output of the gear-box and the input of the rear axle.

This is in particular the case for certain modern buses or coaches with rear engine, in which the overall length of the engine/gear-box assembly and that of the rear axle, particularly of hypoid type, increase without the respective positions of these members being modified.

In such a case, it may be vital to be able reduce, even by a few centimeters only, the extension of the transmission due to the fitting of an electric retarder of the above kind thereon, the possibility of adopting such a retarder being sometimes directly related to such a reduction.

To reduce the extension mentioned, I have proposed in U.S. patent application Ser. No. 07/337/485 filed June 18, 1990 to enlarge the gearbox flange transversely and to fix the rotor rings of the retarder on the periphery of this enlarged flange via a tubular insert extending axially from this periphery on the side opposite the gearbox.

The end flange of the cardan joint concerned is then fixed directly to the gearbox flange, inside said tubular insert.

Such a construction is interesting, in particular because the insert, only transmitting retarding torques and not drive torques may be formed by a very light part, comprising essentially a tube section reinforced with internal radial ribs.

However, this approach assumes that the opening freed in the centre of the retarder has a large diameter, this opening having to be sufficient to receive concentrically the tubular insert and, thereinside, the flange of the cardan joint.

SUMMARY OF THE INVENTION

The present invention proposes a solution which makes it possible to shorten the transmission more than in the preceding solution and which is applicable even to retarders in which the diameter of the central opening is relatively small, as is the case for most of the retarders of the kind considered which exist at present.

For this, the transmissions of the kind in question according to the invention are essentially characterized in that they comprise successively, between the gearbox flange and the nearest journal cross of cardan joint, first of all a tubular insert fixed to the periphery of said gearbox flange on the side opposite the gearbox and then, fixed to said insert, a cardan flange which is "reversed" with respect to the usual flanges, namely disposed on the same side as the shaft of the cardan joint with respect to the centre of the corresponding journal cross and itself formed for this purpose as an annulus surrounding this shaft, the assembly of the "reversed" flange on the insert being made at the level of two external collars forming part respectively of these two parts, which collars are applied axially against each other and form together an annulus on which the two rotor rings of the retarder are fixed axially on each side.

Thus, the centre of the journal cross may be disposed very close to the face on which the gearbox flange is mounted, even for a relatively small diameter of the rotor rings.

In the preferred embodiments, recourse is further had to one and/or other of the following arrangements:

the inner edge of the external collar comprised by the "reversed" flange is connected to a tubular skirt extending on the side opposite the gearbox, the "reversed" flange comprises two lugs projecting axially from this flange on the same side as the gearbox and formed with two coaxial bearings whose common axis is perpendicular to that of said flange, which bearings are adapted for receiving two journals of the journal cross concerned, and the zone of revolution corresponding to the connection of the collar and of the skirt is formed with two radial recesses offset angularly by 90° with respect to the bearings about the axis of the flange, which recesses have bottoms defined by zones of revolution about the axis of said bearings, the tubular insert is formed inwardly with two radial recesses offset angularly by 90° with respect to the bearings of the "reversed" flange, which recesses have bottoms defined by zones of revolution about the axis of these bearings, in an insert according to the preceding paragraph, the means for fixing this insert against the gearbox flange are bolts or pins cooperating with bores which are all assembled together in the two portions of the insert situated angularly between its recesses, the gearbox flange is formed with cavities adapted for receiving the fork, of the cardan joint concerned, which is movable with respect to this flange.

Apart from these main arrangements, the invention comprises certain other arrangements which are preferably used at the same time and which will be more explicitly discussed hereafter.

BRIEF DESCRIPTION OF THE DRAWINGS

In what follows, a preferred embodiment of the invention will be described with reference to the accompanying drawings in a way which is of course in no wise limitative.

FIG. 2 and 3 show on a larger scale, respectively in an end view in the direction of arrow II of FIG. 2 and in axial section through III-III of FIG. 2, a tubular insert forming part of the above transmission, which insert is formed in accordance with the invention.

FIGS. 4 and 5 show on the same scale as FIGS. 2 and 3, respectively in axial section through IV-IV of FIG. 5 and in an end view in the direction of arrow V of FIG. 4, a "reversed" flange forming part of the above transmission, which flange is formed in accordance with the invention.

DESCRIPTION OF THE PREFERRED EMBODIMENTS

Figure 1:
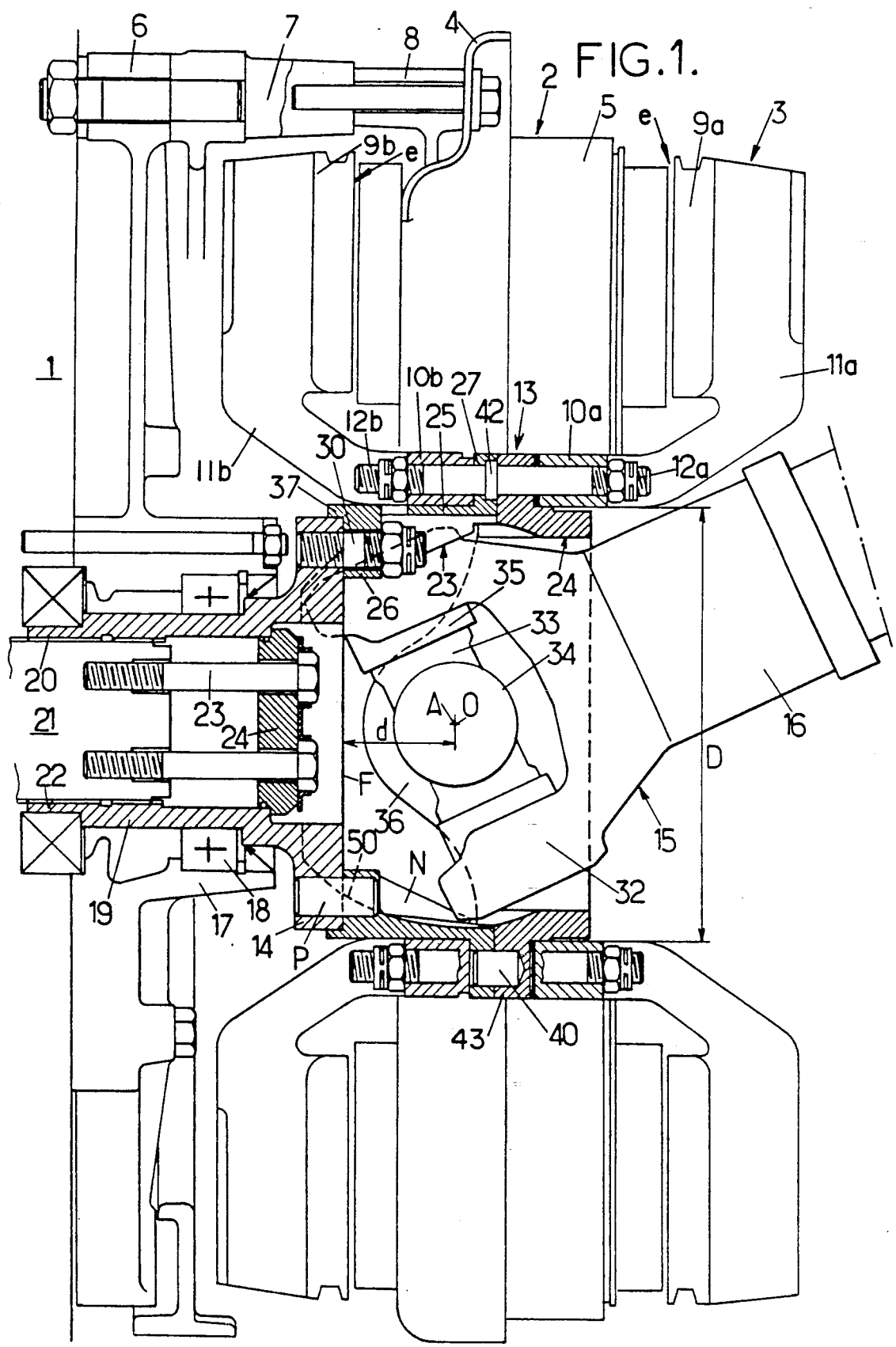
FIG. 1 of these drawings shows in axial section a part of a vehicle transmission, which part is equipped with an electric retarder in accordance with the invention. (It should be noted that the portions shown in section of parts 14, 26 and 23 at the bottom, visible in FIG. 1, correspond to axial planes other than the median vertical axial plane of the transmission, which planes pass respectively through the axes of bores 28, 29 and 39 of FIG. 2, this representation having been adopted so as to show a stud-bolt 30, a hard pin P and a hard pin 40).

The electric retarder considered is of the type known under the trademark "FOCAL" mounted with a horizontal or substantially horizontal axis, cantilevered on the output of a gearbox casing 1.

This retarder comprises an inductor stator 2 and an induced rotor 3.

Stator 2 comprises a substantially annular flange 4 which carries a ring of coils 5, even in number, arranged so as to form by their ends two annular successions of flat magnetic poles with polarities alternating from one to the next.

Flange 4 is mounted on the gearbox casing 1—or more precisely on an intermediate mount 6 itself fixed against the flat front face of said casing 1—by a structure 7 in the form of a star or an apertured bell and with tubular spacers 8.

Rotor 3 comprises two ferromagnetic material discs $9a$ and $9b$ 9 adapted for surrounding the stator axially and each travelling past a succession of poles of this stator from which they are separated by a small clearance or airgap e.

Each disc $9a$ and $9b$ is connected to a corresponding fixing ring $10a$ and $10b$ by a crown of curved arms $11a$ and $11b$ forming ventilation fins and the two rings $10a$ and $10b$ are bolted by means of bolt-nut systems $12a$ and $12b$ to an intermediate annulus 13 to which reference will be made further on.

The problem to be solved is the mounting of this annulus 13 on a "gearbox flange" 14 defined as follows while allowing coupling on the same flange of one of the two cardan joints 15 of the double cardan shaft 16, which joint is placed inside said annulus 13.

The central portion of the gearbox mount 6 has the form of a cylindrical nose 17 carrying, via an end bearing 18, a sleeve 19 whose external axial end is extended radially by flange 14, called in the present text "gearbox flange".

The other axial end of sleeve 19 is splined inwardly at 20 and is force fitted on the end piece 21 of the gearbox, splined externally at 22.

This fitting together is achieved by force so as to avoid any creation of play and it is then held by screwing axially, in end piece 21, screws 23 whose heads are applied against a plate 24 itself bearing on sleeve 19.

As mentioned above, it is proposed to mounted the annulus 13 on the gearbox flange 14.

To shorten as much as possible the transmission because of the above mentioned requirements, the axial lengths of nose 17 and of sleeve 19 are relatively small and flange 14 extends close to the axial end of said nose 17.

Thus, and since the two rotor crowns 9-12 are identical and so have the same size, there would not be sufficient room in the annular hollow of structure 7 to house therein the crown the closest to the gearbox if the annulus merged with the periphery of flange 14.

Another reason why such an approach cannot be contemplated resides in the requirements of force fitting since, as mentioned above, it would then be necessary to fit the internal rotor crown on the flange before fitting this flange to the gearbox.

It is to solve such difficulties that recourse is generally had to an insert plate fixed externally on the gearbox flange 14, the periphery of this insert plate then forming annulus 13 and the end flange of the cardan joint 15 being then fixed to said insert plate.

According to the invention, this insert plate which is particularly heavy and cumbersome is omitted, the whole of said plate and the end flange of the usual cardan joint being replaced by the assembly of a tubular insert 23 and a "reversed" flange 24.

The tubular insert 23 comprises a cylindrical sleeve 25 connected at one of its ends to an internal collar 26 and at its other end to an external collar 27.

The internal collar 26 is pierced with cylindrical bores 28, 29 (FIG. 2) adapted to cooperate respectively with threaded stud bolts 30 (FIG. 1) anchored in the periphery of the gearbox flange 14 and with smooth and hard pins P.

As can be seen in FIG. 2, the bores in question, eight in number for the first ones 28 and two for the others 29, are grouped together in two diametrically opposite arcs of circles and each extending substantially over 120°, each arc comprising two pairs of bores 28 surrounding a bore 29.

Ribs N, advantageously with a triangular shape as shown in FIG. 1, are provided between the two bores 28 of each pair.

Between the two arcs mentioned, the tubular insert 23 comprises two recesses 31 adapted to receive with play the fork 32, of the cardan joint 15, which is movable with respect to said insert.

The cardan joint 15 in question in fact comprises, in a way known per se, between its fixing flange—which is here the "reversed" flange 24—and the shaft section 16, on the one hand, a journal cross 33 carrying four journals 34 and 35 and, on the other hand, two forks each adapted for pivotally receiving two journals of the journal cross in two coaxial bearings, these two forks 36, 32 being fast respectively with flange 24 and the shaft section 16.

The bottoms of recesses 31 are defined by zones of revolution about the axis A common to the two journals 34 carried by fork 36.

The largest diameter portion of collar 26 is extended on gearbox 1 side by an annular heel 37 adapted to jointingly cover the gearbox flange 14 for relative centering purposes.

Apertures 38 (FIG. 3) are formed radially in the cylindrical sleeve 25 for ventilation purposes.

The external collar 27 forms a part of the above annulus 13.

It is formed:

on the one hand, with cylindrical holes 39 (FIGS. 2 and 3), particularly four in number, for receiving hard pins 40 for angular coupling with flange 24, and, on the other hand, with shouldered holes 41, particularly four in number, adapted to be traversed by the bolt-nut systems 12 for mounting the rotor crowns and serving as seats prohibiting rotation for non circular "heads" or steps 42 included in said systems.

In so far as the "reversed" flange 24 is concerned, it comprises:

an external collar 43 (FIGS. 4 and 5) adapted to form annulus 13 by juxtaposition thereof with the above collar 27, two lugs projecting axially from this collar 43 on 1 side and forming the two legs of fork 32, legs are formed with bearings 44 for the journals 34, and a cylindrical skirt 45, extending on the side opposite gearbox 1 for mechanically reinforcing the flange.

For fixing collar 43 on collar 27, the first one is formed with through-holes 46 through which the bolt-nut systems 12 pass and with blind holes 47 in which the hard pins 40 are force fitted.

Holes 46 are advantageously four in number and the same goes for holes 47, these different holes being distributed evenly all round the collar concerned 43.

As can be seen in FIGS. 4 and 5, the "reversed" flange 24 comprises, like the tubular insert 23, two radial recesses 48 formed in the connection zone between collar 43 and the cylindrical skirt 45, which recesses have bottoms intended to axially extend those of recesses 31 of the tubular insert, said bottoms being again of revolution about the axis A of the two journals 34.

It should be noted that, since axis A is closer to gearbox 1 than collar 43, the bottoms in question of recesses 48 will narrow in the direction of skirt 45 so that this extension defines a slightly restricted opening for housing the cardan joint 15.

There can be further seen in FIG. 5, at 49, circular grooves provided for receiving locking rings, of circlip type, for the journals 34 housed in bearings 44.

Each of the two annular parts 23 and 24 must of course be sufficiently strong mechanically to be able to transfer drive torques between the double cardan shaft 16 and the gearbox flange 14.

These parts are advantageously formed from semi-hard drop-forged steel.

Similarly, pins P and 40 which assume the essential part of the transfer of torque between the different parts coupled together are made from a very resistant material such as hard steel.

As can be seen in FIG. 1, it is further advantageous to provide in the gearbox flange 14 itself cavities 50 which are disposed in the axial extension of the recesses 31 of insert 23 and which receive with play, like the latter, the arms of fork 32 when the inclination of the axis of shaft 16 with respect to that of said gearbox flange is high.

The bottoms of the external portions of these cavities 50 are again of revolution about axis A of journals 34.

Following which and whatever the embodiment adopted, a vehicle transmission equipped with an electric retarder of FOCAL type is finally obtained whose construction follows sufficiently from the foregoing.

This transmission has the double advantage:

of being extremely short, the axial distance d between the centre 0 of the journal cross 33 and the front face F of application of the tubular insert 23 against the gearbox flange 14 being as small as 47 mm for an electric retarder whose external diameter is about 500 mm, and of being able to be used with an electric retarder of a presently existing type, namely with a relatively narrow central opening, the inner diameter D of its rotor rings 10 being as small as 180 mm.

The very small number of fixing means required will also be noted.

It is in fact the bolt-nut systems 12 usually provided for fixing the two rotor rings 10 on annulus 13 which are here further used for assembling the two parts 23 and 24 one against the other; it is true that in addition pins 40 are provided for transferring the torque between these two parts, but no additional screw system is required for their mutual assembly, and it may in short be considered that the proposed construction comprises for example less screwing members than the one mentioned above in which the rotor rings are fixed to a tubular insert itself fixed to the enlarged periphery of the gearbox flange and in which the cardan joint comprises a normal end flange fixed directly to said gearbox flange.

As is evident, and as it follows moreover already from what has gone before, the invention is in no wise limited to those of its modes of application and embodiments which have been more especially considered; it embraces, on the contrary, all variants thereof.

I claim:

1. A vehicle transmission comprising a gearbox including a casing, a cardan joint including a shaft and a journal cross and an electric eddy current retarder comprising an annular inductor stator cantilevered on the casing of the gearbox by means of a frame, and a rotor comprising two induced ferromagnetic material discs which surround the stator and are both supported by a gearbox flange cantilevered on a stub shaft inside the casing, each said disc being connected by means of a respective crown of arms forming ventilation fins, to a respective ring affixed to said flange, said transmission further comprising, disposed between the gearbox flange and the journal cross of the cardan joint, a tubular insert affixed to the periphery of said gearbox flange on the side of the flange away from the gearbox and a cardan flange affixed to said insert and to said cardan joint and disposed on the same side thereof as the shaft of the cardan joint with respect to the center of the journal cross, said cardan flange comprising an annulus surrounding said shaft and including an external collar, and said insert including an external collar affixed to and in axial abutment with the external collar of the cardan flange such that said collars together form an annulus to which the rotor rings of the retarder are affixed axially on each side thereof.

2. Transmission according to claim 1, wherein the inner edge of the external collar of the cardan flange is connected to a tubular skirt extending away from the gearbox.

3. Transmission according to claim 2, wherein the cardan flange includes a skirt, wherein the cardan flange further comprises two lugs, projecting axially from the cardan flange on the same side as the gearbox and including two coaxial bearings having a common axis extending perpendicular to the axis of said cardan flange, for receiving two journals of the journal cross, and wherein the external collar of the cardan flange and the skirt of the cardan flange are connected together by a zone of revolution including two radial recesses offset angularly by 90° with respect to said bearings around the axis of the cardan flange, said recesses including bottoms defined by zones of revolution about the axis of said bearings.

4. Transmission according to claim 1, wherein the cardan flange includes two lugs including coaxial bearings having a common axis and the tubular insert includes two radial recesses offset angularly by 90° with respect to the bearings of the cardan flange, said radial recesses including bottoms defined by zones of revolution about the common axis of said bearings.

5. Transmission according to claim 4, further comprising bolts for securing the insert against the gearbox flange, said bolts cooperating with bores grouped together in the two portions of the insert situated angularly between said recesses.

6. Transmission according to claim 1, wherein the cardan joint includes a fork and wherein the gearbox flange is includes cavities for receiving the fork of the cardan joint, which, said fork being movable with respect to said gearbox flange.

* * * * *